United States Patent
Reid, Jr. et al.

[11] 3,712,289
[45] Jan. 23, 1973

[54] DEEP FAT FRYER

[75] Inventors: Edward A. Reid, Jr.; William F. Morse, both of Columbus, Ohio

[73] Assignee: Columbia Gas System Service Corporation, New York, N.Y.

[22] Filed: July 16, 1971

[21] Appl. No.: 163,332

Related U.S. Application Data

[62] Division of Ser. No. 10,126, Feb. 10, 1970, Pat. No. 3,671,174.

[52] U.S. Cl. .................. 126/391, 126/39 J, 126/41 R
[51] Int. Cl. ............................................... A47j 37/12
[58] Field of Search ........... 126/369, 391, 39 J, 41 R; 99/403, 408; 431/174, 326, 328

[56] References Cited

UNITED STATES PATENTS

| | | | |
|---|---|---|---|
| 2,827,379 | 3/1958 | Phelan | 99/403 |
| 3,470,862 | 10/1969 | Darrow et al. | 126/39 J |
| 1,213,470 | 1/1917 | Finlay | 431/328 X |
| 2,997,941 | 8/1961 | Phelan et al. | 99/332 |
| 3,267,924 | 8/1966 | Payne | 126/41 R |

FOREIGN PATENTS OR APPLICATIONS

| | | | |
|---|---|---|---|
| 1,214,454 | 11/1959 | France | 99/403 |

*Primary Examiner*—William F. O'Dea
*Assistant Examiner*—W. C. Anderson
*Attorney*—Curtis, Morris & Safford

[57] ABSTRACT

A deep fat frying unit having a glass cooking vessel adapted to hold a supply of cooking oil. The unit is heated by an annular infrared radiant gas burner assembly which heats the oil primarily by infrared radiation passing from the burner assembly directly through the vessel wall. The burner assembly is above the bottom of the vessel so that there is a cool zone at the bottom of the vessel which eliminates burning food sediment deposited therein. The radiant heat is absorbed by the oil in an annular zone adjacent the vessel wall and this produces oil circulation by convection upwardly along the wall and downwardly at the center of the vessel, but without overheating the oil.

10 Claims, 5 Drawing Figures

PATENTED JAN 23 1973 3,712,289

INVENTOR.
Edward A. Reid, JR.
BY WILLIAM F. MORSE
Curtis, Morris & Safford
ATTORNEYS

DEEP FAT FRYER

This application is a division of application Ser. No. 10,126, filed Feb. 10, 1970, now U.S. Pat. No. 3,671,174.

This invention relates to cooking foods in deep fat, and in particular to deep fat frying units which have infrared radiant heat gas burners.

In deep fat fryer units presently available the cooking oil is generally heated by conduction through the wall of the cooking vessel at or near the bottom of the vessel. Such arrangements are relatively inefficient, and food sediment such as bread crumbs, which fall free of the food being fried to the bottom of the vessel, are burned. This creates difficulties in that the oil is contaminated and cleaning of the vessel becomes more difficult as the burned food particles adhere to the vessel wall.

It is an object of this invention to provide a cooking unit to rapidly heat cooking oil to its working temperature. It is a further object of this invention to provide a deep fat frying unit to maintain cooking oil at working temperature during deep fat frying operations. It is another object of this invention to provide a deep fat frying unit to maintain a low temperature at the bottom of a deep fat frying vessel during the cooking operation. It is a further object of the invention to provide a deep fat frying unit which eliminates burning of food sediment in the base of a deep fat frying vessel. It is a still further object of this invention to provide a compact and efficient deep fat frying cooking unit.

In the preferred embodiment of this invention a generally annular heater unit is disposed concentric to, and surrounding, a deep fat frying vessel. The heater unit is formed by a plurality of arcuate infrared radiant heat gas burner units which transfer heat, primarily by radiation through the substantially vertical side wall of the vessel. It has been found that transferring heat through the vertical wall of a vessel by conduction is inefficient and that the amount of heat so transferred is limited due to the limited amount of heat transfer area available; on the other hand, radiant heating has been found to be particularly useful in an application such as deep fat frying since cooking coil is a good infrared absorber.

The burner structure is positioned above the bottom of the cooking vessel to heat an intermediate section of the cooking oil. Placing the burners in this manner provides a relatively cool bottom section of oil in the vessel to prevent burning of sediment on the bottom wall thereof and in addition, heat is then transferred rapidly to the top section of the cooking oil by convection from the intermediate section. Since deep fat frying generally occurs in the top of the cooking vessel, with the food contained in a wire basket, it is evident that rapid heating of the top section of the oil is a particularly advantageous expedient.

A thermometer or other temperature sensitive element is placed within a cylinder in the cooking vessel. The cylinder is located generally opposite the radiant heating element and shields the temperature sensitive portion of the thermometer from radiant heat. In this manner the temperature of hot oil, which flows upwardly through the cylinder due to convection, is adapted to be continuously monitored and the thermometer can be used to control the heating units to maintain a constant temperature in the oil.

The construction of such a preferred embodiment, as well as the advantages thereof will become further apparent from the following specification when considered in conjunction with the accompanying drawing wherein.

Figure 2:
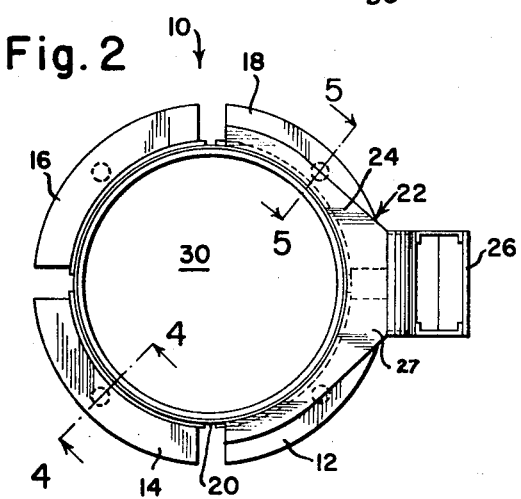
FIG. 2 is a plan view of the heater unit shown in FIG. 1.
Figure 5:
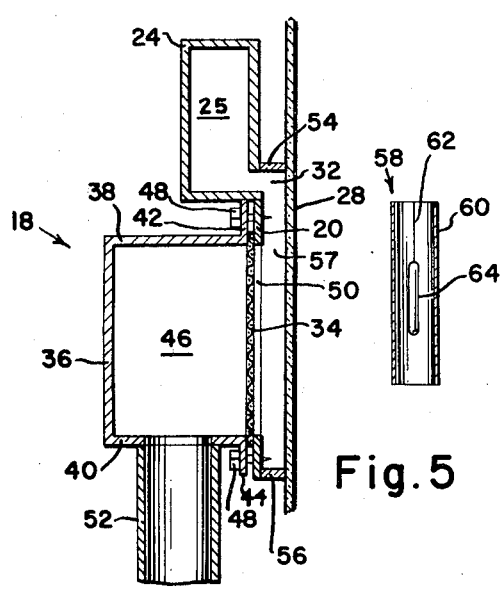
Figure 4:
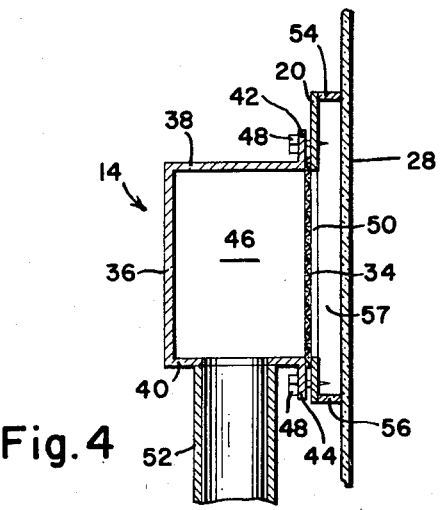

FIGS. 4 and 5 are sectional views respectively, taken on the lines 4—4 and 5—5 of FIG. 2.

Figure 1:
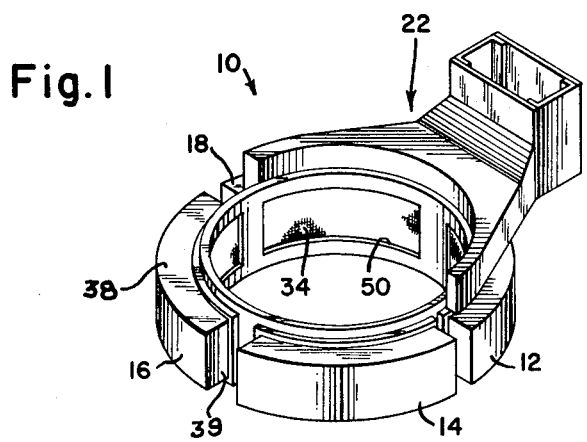
FIG. 1 is a perspective view of the heater unit of this invention.

Referring to the drawings, and particularly FIGS. 1 and 2, there is illustrated an annular heating unit 10 which includes four infrared gas burner units 12, 14, 16 and 18 mounted upon a common cylindrical frame 20.

Figure 3:
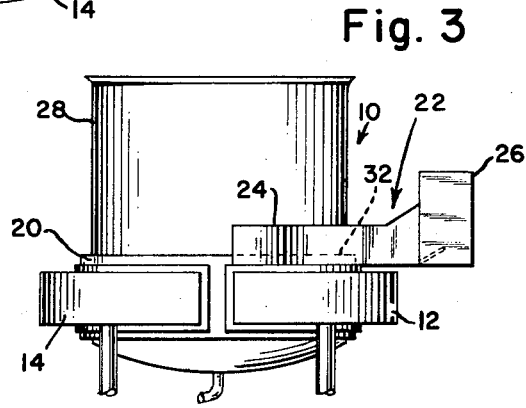
FIG. 3 is an elevational view of a cooking vessel and heater unit.

Heating unit 10 defines a generally circular interior heating zone 30 in which there is placed a cooking vessel 28, see FIG. 3 as well, which is adapted to hold the fluid, e.g. cooking oil, to be heated by heating unit 10. Radiant heat is provided through the vertical wall of vessel 28 from each of the burner units 12, 14, 16 and 18 and, as will be more fully explained hereinafter, the products of combustion of these units provide some heat by convection to the vessel as they are discharged from the burners through an exhaust assembly 22.

Each of the gas burner units describes an arc of substantially 90° and each has a generally similar construction. It should be understood however, that while four burner units are illustrated in the drawing, more or less such units may be used according to the desired design or application involved.

As seen in the drawings, each of the burner units is formed as a generally arcuate member fixed to the common frame 20. Curved walls 36, 38, 40 and the end walls 39 form each of the burner units and define individual burner plenums or chambers 46 (see FIGS. 1 and 4). Top and bottom walls 38 and 40 are provided with vertically extending flanges 42 and 44 respectively, adjacent the open side of the plenums 46 opposite wall 36. Frame 20 includes a plurality of generally rectangular openings 50 and each of the burner units is mounted on the frame 20 in a position such that its open side is contiguous with one of the openings 50. The burners are secured in this position by a plurality of screws 48 which extend through the flanges 42 and 44 into the frame 20.

Openings 50 are covered by foraminous radiant heating elements 34 which are clamped in place between the flanges 42 and 44 of the burner units and the frame 20. Preferably these elements are formed from 40 mesh, 0.011 inch diameter Inconel wire screen.

Frame 20 as seen in FIG. 3 is positioned around the vertical side wall of the vessel 28 above the bottom portion thereof. Accordingly, heat will be supplied to the cooking fluid in the vessel at an intermediate section thereof and, since the hot oil will rise and flow through convection, the section of oil in the base of vessel 28 will remain relatively cool, thus eliminating burning of food sediment in the base.

A gas-air fuel mixture is supplied to burner plenum 46 through a line 52 from an orifice venturi aspirator supply means (not shown) powered by natural gas. The fuel mixture flows through foraminous screen 34 into the peripheral heating and exhaust chamber 57, where is is ignited by any conventional mechanism, such as a pilot or piezoelectric ignitor. Combustion of the fuel in chamber 57 heats elements 34 to incandescence to produce infrared radiation to heat the vessel 28 and the cooking fluid therein. It is noted that the small constrictions or apertures in the foraminous element 34 provide a sufficiently high rate of flow of fuel mixture from plenum 46 into chamber 57 to prevent flash back into plenum 46.

Chamber 57 is formed by annular metal rings 54 and 56 which are fixed, in gas sealing relation, to the frame 20 and the exterior wall of vessel 28. By this construction, all of the products of combustion of the burners are contained adjacent to the vessel as they are discharged from the heater unit in order to provide additional heat to the vessel 28 by convection.

Frame 20 includes a recessed portion above burners 12 and 18 which, with rings 54, defines a semicircular slot 32 through which the products of combustion in chamber 57 are discharged. Exhaust assembly 22 includes a pair of exhaust ducts 24, which, as seen in FIGS. 2 and 5, have a generally rectangular cross-section and an interior cavity 25 which communicates through slot 32, with chamber 57. Ducts 24 deliver the gases through a generally wedge shaped common portion 27, to a generally rectangularly shaped flue diluter 26 wherein the products of combustion are mixed by convection with ambient air to reduce their temperature.

A temperature sensing device, or thermometer 58, is located within the vessel 28 in order to monitor the temperature of the cooking fluid therein. A generally cylindrical member 60 surrounds the temperature sensitive element 64 of the thermometer to shield element 64 from radiation. Hot oil within vessel 28 will flow upwardly through cylinder 60 and around element 64 by convection and thus thermometer 58 will monitor only hot oil temperature. Wire 62 serves to operatively connect temperature sensitive element 64 with the temperature read out portion of the thermometer (not shown) in a conventional manner and to support shield 64 within vessel 28.

The thermometer, located in this manner, is used to regulate the gas burners to maintain a constant cooking and fluid working temperature and thus keep temperature fluctuations to a minimum.

The present invention is also adaptable to automatic controls and with such controls could maintain a much narrower range of temperature variation in the cooking oil than is now possible with electric heating. When burner system 10 is turned on, it starts producing infrared radiation in only a few seconds. Similarly, when the burner system is turned off, heating stops almost instantaneously. This advantage can be used in conjunction with a precise control system so that a "tight" control loop is maintained whereby fluctuations in oil temperature are kept to a minimum. Such a control system would take into acount the time lag required for transfer of heat from the burner area to the location of the sensing element and would cut off the flow of gas to the burners before the sensing element could indicate that the oil had reached operating temperature. A proportional control method could also be used instead of such an on-off method.

Cooking vessel 28, used in heating unit 10, may be open to the atmosphere or pressurized, and in a preferred embodiment is composed of a transparent material. Where a transparent glass composition vessel is used a substantial portion of the infrared heat output of the burners heats the cooking fluid in the vessel directly and thus any problems involving "skin-effect" or poor conducting mediums are eliminated. It is noted, however, that the glass vessel itself does absorb some infrared radiation, generally about 30 percent thereof, and this heat is then transferred to the oil by conduction.

The apparatus of the present invention provides a particularly useful heating method in deep fat frying since cooking oils are known to be good radiant heat absorbers. Oil in the annular zone adjacent the vessel wall opposite to the radiant heater units absorbs the radiant heat and flows upwardly along the vessel wall by convection. A convective circulatory flow is thus produced within the vessel to heat all of the cooking oil therein. It has been found that direct heating of the cooking fluid yields an eight percent (8 percent) improvement in overall thermal efficiency of the fryer relative to a metal vessel.

It is foreseen, however, that for certain applications where additional strength may be required other materials may be used, as for example, stainless steel. Where a metal vessel is used with the heating unit of this invention, the radiant heat given off by burners 12, 14, 16 and 18 heats the walls of vessel 28 and thus fluid within the vessel is heated by conduction through contact with the vessel walls.

In operation a gas-air fuel mixture is supplied to plenum 46 of each of the burner units 12, 14, 16 and 18 through an orifice venturi aspirator powered with natural gas at conventional pressures. The fuel mixture flows through foraminous radiant heating element 34 into heating chamber 57 where it is ignited. The hot gases in chamber 57 heat element 34 which then produces infrared radiation to heat cooking vessel 28 and the cooking fluid therein, as described above. The products of combustion transfer additional heat by convection to vessel 28 and are then discharged through ducts 24 and flue 26. Thermometer 58, located in the vessel, is operative to maintain a desired working temperature in the cooking fluid, generally within the range of 325° to 375°F.

It is thus seen that a compact deep fat frying unit is provided which is effective to rapidly heat cooking oil in a vessel and yet maintain a relatively cool area of fluid in the base of the vessel to eliminate burning of food sediment therein.

What is claimed is:

1. A frying apparatus wherein a vessel containing cooking oil is to be heated along its side wall intermediate its top and bottom ends comprising, a chamber means mounted on the periphery of said vessel in gas sealing relation therewith and providing a heating cavity, said chamber means including an exterior wall means spaced from and substantially parallel to the adjacent vessel wall and having a plurality of gas inlet openings therein, a gas burner plenum mounted on said exterior wall adjacent each of said openings for communication through its associated inlet opening with said cavity, a foraminous radiant heating element positioned between said exterior wall and said plenum, means for supplying a combustible gas mixture to each of said plenums whereby, said mixture flows through said element for combustion in said cavity to produce radiant heat from said element for heating said vessel.

2. The frying apparatus as defined in claim 1 wherein said vessel is generally circular and said exterior wall is concentric therewith.

3. The gas burner as defined in claim 1 wherein a thermometer is mounted within said vessel and includes a shield means having a generally vertically extending bore and a temperature sensitive element positioned within said shield means whereby said element is shielded from radiant heat and is sensitive to the temperature of cooking fluid in said vessel as it flows upwardly through said bore by convection.

4. The gas burner as defined in claim 1 wherein said vessel is formed of a transparent glass composition material whereby cooking oil in said vessel is directly heated by said radiant heating.

5. The frying apparatus as defined in claim 1 including means associated with said cavity for removing the products of combustion therefrom whereby heat by convection is supplied to said vessel as the products of combustion are removed from said cavity.

6. The frying apparatus as defined in claim 5 wherein each of said plenums comprises a generally arcuate member describing an arc of substantially 90°.

7. The frying apparatus as defined in claim 6 wherein said means for removing the products of combustion from the cavity includes a pair of gas ducts communicating with the upper portion of said cavity along an arcuate portion thereof and an expanded duct adapted to receive the combustion products from said gas ducts and discharge them into the atmosphere.

8. A deep fat frying apparatus comprising, in combination, a generally cylindrical cooking vessel adapted to contain heated cooking oil, heating chamber means mounted on the periphery of said vessel intermediate its top and bottom ends in air-tight relation therewith and including a generally circular wall having at least two generally rectangularly shaped arcuate openings therein, arcuate burner plenum means mounted on said circular wall contiguous to each of said openings and having an open side coextensive with its associated opening, a foraminous radiant heating element interposed over said openings between each of said burner plenum means and said circular wall, means for supplying a combustible fuel mixture to each of said burner plenum means, and an exhaust means communicating with said heating chamber means, whereby, said fuel mixture flows through said element for combustion in said heating chamber means to supply heat to said vessel by infrared radiation from said element and by convection from the products of combustion as said products are discharged from said chamber by said exhaust means.

9. The deep fat frying apparatus as defined in claim 8 wherein a thermometer is mounted within said vessel and includes a shield means having a generally vertically extending bore and a temperature sensitive element positioned within said shield means whereby said element is shielded from radiant heat and is sensitive to the temperature of cooking fluid in said vessel as it flows upwardly through said bore by convection.

10. The deep fat frying apparatus as defined in claim 8 wherein said vessel is formed of a transparent glass composition material whereby said cooking oil in said vessel is directly heated by said radiant heating.

* * * * *